(12) United States Patent
Boertjes et al.

(10) Patent No.: US 9,197,322 B2
(45) Date of Patent: Nov. 24, 2015

(54) DIGITAL OPTICAL SPECTRAL SHAPING

(71) Applicants: David W. Boertjes, Nepean (CA); Kevin MacNeill, Kinburn (CA); Jamie Gaudette, Richmond (CA)

(72) Inventors: David W. Boertjes, Nepean (CA); Kevin MacNeill, Kinburn (CA); Jamie Gaudette, Richmond (CA)

(73) Assignee: CIENA CORPORATION, Hanover, MD (US)

( * ) Notice: Subject to any disclaimer, the term of this patent is extended or adjusted under 35 U.S.C. 154(b) by 0 days.

(21) Appl. No.: 14/173,033

(22) Filed: Feb. 5, 2014

(65) Prior Publication Data

US 2015/0222360 A1 Aug. 6, 2015

(51) Int. Cl.
*H04B 10/04* (2006.01)
*H04B 10/2513* (2013.01)
*H04B 10/516* (2013.01)
*H04L 25/03* (2006.01)
*H04L 7/00* (2006.01)
*H04B 10/61* (2013.01)

(52) U.S. Cl.
CPC ........ *H04B 10/25137* (2013.01); *H04B 10/516* (2013.01); *H04B 10/6161* (2013.01); *H04L 7/0075* (2013.01); *H04L 25/03828* (2013.01)

(58) Field of Classification Search
CPC ............. H04B 10/505; H04B 10/5055; H04B 10/516; H04B 10/58; H04B 10/2507; H04B 10/25073; H04B 10/2513; H04B 10/25137; H04B 10/61; H04B 10/616; H04B 10/6161; H04B 10/40; H04B 10/43; H04B 10/60
USPC ......... 398/192, 193, 194, 202, 208, 209, 140, 398/141, 147, 158, 159, 33, 38, 25, 26, 27, 398/28, 29, 183, 195, 135, 136, 137, 138, 398/139, 81, 196, 197, 198
See application file for complete search history.

(56) References Cited

U.S. PATENT DOCUMENTS

| | | | |
|---|---|---|---|
| 7,023,601 B2 | 4/2006 | McGhan et al. | |
| 7,558,479 B1 * | 7/2009 | Robinson | 398/28 |
| 7,561,797 B1 * | 7/2009 | Harley et al. | 398/26 |
| 7,606,498 B1 | 10/2009 | Wu et al. | |
| 8,385,747 B2 | 2/2013 | Roberts et al. | |
| 8,731,413 B1 * | 5/2014 | Dave et al. | 398/208 |

* cited by examiner

*Primary Examiner* — Hanh Phan
(74) *Attorney, Agent, or Firm* — Kent Daniels; Daniels IP Services Ltd

(57) ABSTRACT

A method and system for generating an optical channel signal for transmission through an optical fiber link of an optical communications system. A digital filter processes an input data signal using a compensation function and a shaping function to generate a pair of multi-bit sample streams representing a target optical E-field envelope of the optical channel signal. A modulator modulates an optical carrier light using the pair of multi-bit sample streams to generate the optical channel signal. The compensation function is designed to at least partially compensate impairments of the optical fiber link. The predetermined shaping function is designed to modify a baseband spectrum of the target optical E-field envelope.

20 Claims, 6 Drawing Sheets

DIGITAL OPTICAL SPECTRAL SHAPING

CROSS-REFERENCE TO RELATED APPLICATIONS

This is the first application filed in respect of the present invention.

MICROFICHE APPENDIX

Not Applicable.

TECHNICAL FIELD

The present invention relates to optical communications systems, and in particular to digital optical spectral shaping in an optical communications system.

BACKGROUND OF THE INVENTION

In the optical communications space, various techniques are used to synthesize an optical communications signal for transmission. FIG. 1A illustrates a popular technique in which a laser 2 is coupled to an optical modulator 4. The laser 2 generates a narrow-band continuous wave (CW) optical carrier signal 6 having a desired wavelength. The optical modulator 4 operates to modulate the amplitude and/or phase the carrier signal 6 to generate an optical channel signal 8, based on a drive signal 10 that encodes data to be transmitted. The optical channel signal 8 is transmitted through an optical fibre link 12 to a receiver 14. Typically, the optical fibre link 12 will include multiple optical fibre spans cascaded in series with various optical equipment including, for example, WDM Mux/Demuxers, optical amplifiers, Optical Add-Drop Multiplexers (OADMs) etc.

Typically, the drive signal 10 is generated by a driver circuit 16, which normally includes a Digital to Analog Converter (DAC) 18, a Low-Pass Filter (LPF) 20 and a Low Noise Amplifier (LNA) 22.

Referring to FIGS. 1B-1D, the DAC 18 operates to convert an input digital signal x(n) into a corresponding analog signal having a spectrum of the type illustrated in FIG. 1B. As is well known in the art, the spectrum comprises a baseband signal 24 between 0 and ±Fs/2 Hz (where Fs is the sample rate of the DAC) and harmonic bands 26 at frequencies beyond ±Fs/2. As may be seen in FIG. 1C, these harmonic bands 26 are suppressed by the Low-Pass Filter 20, having a filter characteristic 28 with a 3 dB cut-off at or near Fs/2, so that the amplified drive signal 10 output from the LNA 22 is dominated by the baseband signal 24, as may be seen in FIG. 1D. Modulating the CW carrier 6 using the drive signal 10 results in a modulated channel signal 8 having a spectrum closely similar to that shown in FIG. 1D. This channel signal 8 can be multiplexed with other channel signals in a manner well known in the art to produce a Wavelength Division Multiplexed (WDM) signal (FIG. 1E) for transport through the optical fiber link 12.

As may be seen in FIG. 1D, the spectrum of the drive signal (and thus also of the optical channel signal 8) contains out-of-band noise 30 lying at frequencies beyond ±Fs/2. This out-of-band noise 30 is the residual portion of the harmonic bands 26 that was incompletely suppressed by the LPF 20. The presence of this noise is primarily due to the fact that the filter characteristic 28 of the LPF has a finite roll-off beyond the 3 dB cut-off frequency, as may be seen in FIG. 1C.

As is well known in the art, the out-of-band noise 30 can interfere with adjacent channels of a WDM signal. Typically, this problem is addressed by designing the optical communications system to provide a guard-band 32 between adjacent channels, as may be seen in FIG. 1E. The width of the guard band 32 can be selected so that most of the energy represented by the out-of-band noise 30 lies within a guard band 32 rather than an adjacent channel. A limitation of this solution is that each guard band 32 represents un-used spectral capacity of the optical communications system. It would be desirable to use this spectral capacity for carrying subscriber data.

One known approach to addressing this limitation is to adjust the filter characteristic 28 of the LPF 20 so that the 3 dB cut-off lies below Fs/2. This has the effect of more strongly suppressing the harmonic bands 26, and so reduces the out-of-band noise 30, but at a cost of also suppressing frequency components of the baseband signal 24 near ±Fs/2. In some cases, this can create a difficulty in that clock and carrier recovery circuits in the receiver 14 may need the frequency content of the baseband signal near ±Fs/2 in order to reliably compensate phase and frequency jitter in the received optical signal. This imposes a limitation on the extent to which a real filter 20 can be used to suppress the harmonic bands 26 and therefore limit out-of-band noise 30 in the optical signal 8. Consequently, conventional optical communications networks operate with a compromise solution in which spectral capacity of the network is sacrificed in order to maintain accurate clock and carrier recovery.

Techniques that overcome at least some of the above limitations would be highly desirable.

SUMMARY

Accordingly, aspects of the present invention provide methods and systems for generating an optical channel signal for transmission through an optical fiber link of an optical communications system. A digital filter processes an input data signal using a compensation function and a shaping function to generate a pair of multi-bit sample streams representing a target optical E-field envelope of the optical channel signal. A modulator modulates an optical carrier light using the pair of multi-bit sample streams to generate the optical channel signal. The compensation function is designed to at least partially compensating impairments of the optical fiber link. The predetermined shaping function is designed to modify a baseband spectrum of the target optical E-field envelope.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION present invention provides methods and apparatus for controlling signal to noise ratio (SNR) at a receiver end of an optical link. Embodiments of the invention are described below, by way of example only, with reference to FIGS. 2-5.

Figure 1A:
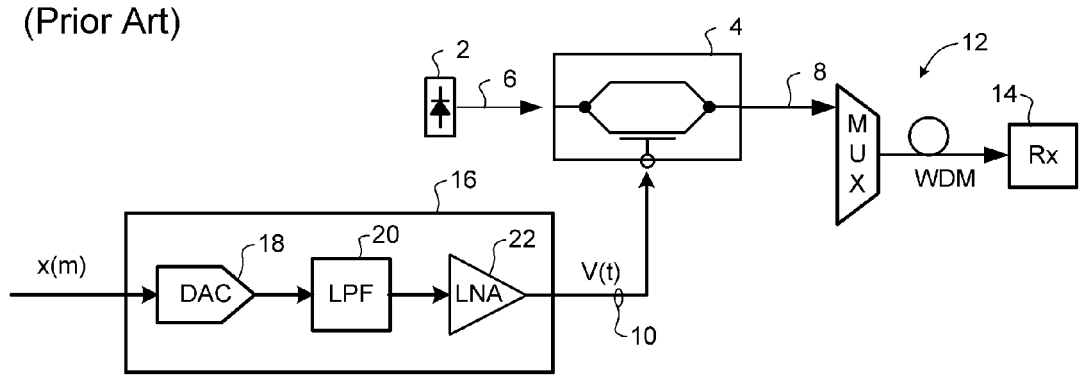
FIGS. 1A-1E schematically illustrate principal components and operation of a one-dimensional communications signal synthesizer known in the prior art.
Figure 1B:
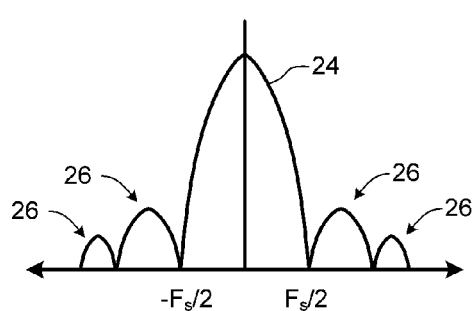
Figure 1C:
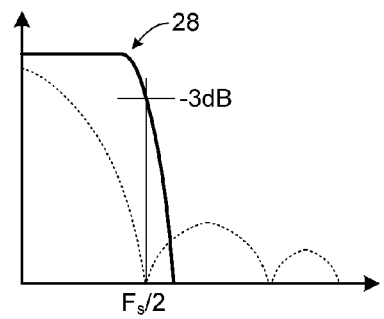
Figure 1D:
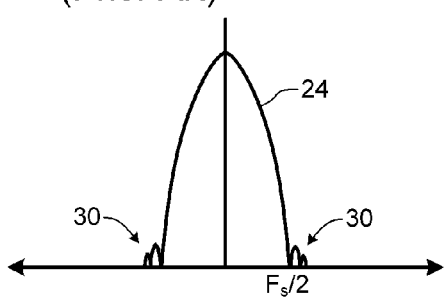
Figure 1E:
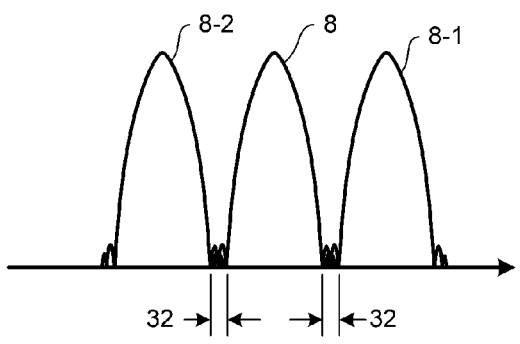
Figure 2A:
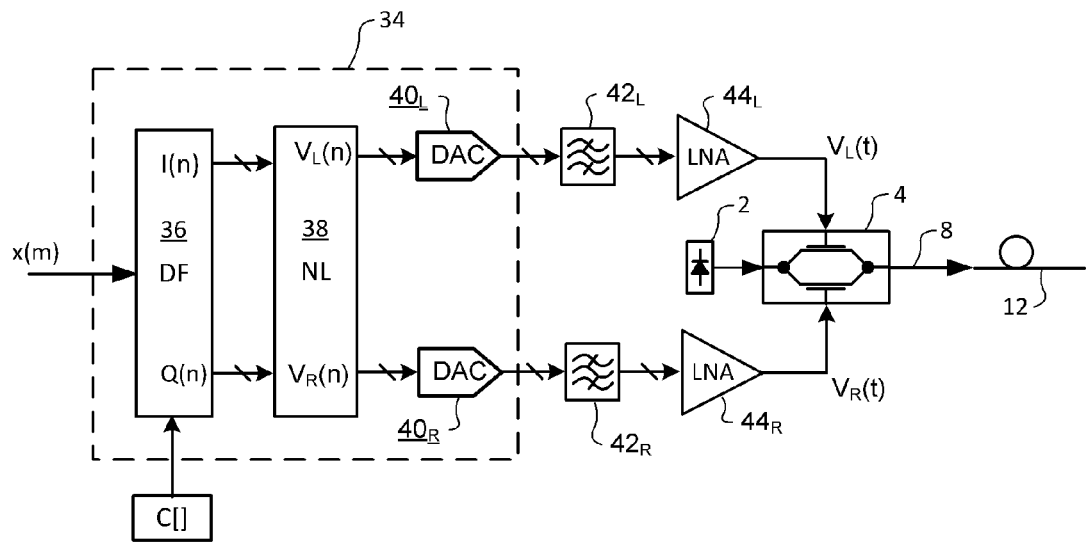
FIGS. 2A-2B schematically illustrate principal components of a transmitter known from applicant's co-assigned U.S. Pat. No. 7,023,601, and a receiver known from applicant's co-assigned U.S. Pat. No. 7,606,498.

FIG. 2A illustrates digital signal processor (DSP) based optical transmitter known, for example, from Applicant's co-assigned U.S. Pat. No. 7,023,601, which issued Apr. 4, 2006. In that system, a complex driver circuit 34 comprises a digital filter 36 which uses the input data signal x(m) and a compensation function c(t) to calculate multi-bit In-Phase and Quadrature component values I(n) and Q(n) of a target optical E-field modulation. A non-linear compensator 38 uses the I(n) and Q(n) components to compute multi-bit sample streams VR(n) and VL(n). These digital sample streams are then converted into corresponding analog signals by respective multi-bit digital-to-analog converters (DACs) 40, filtered (at 42) to suppress the harmonic bands 26, and scaled by low noise amplifiers 44 to yield a pair of drive signals $V_R(t)$ and $V_L(t)$. These drive signals are then supplied to respective branches of the MZ modulator 4. If desired, respective digital filters (not shown) may be positioned between the non-linear compensator 38 and the DACs 40 in order to compensate any propagation delay differences between the DACs 40 and the MZ modulator 4.

The transmitter arrangement of FIG. 2A is particularly advantageous in that the multi-bit sample values $V_R(n)$ and $V_L(n)$ can be computed taking into account non-linearities of the analog signal path (e.g. the DACs 40, filters 42 and LNAs 44) and the MZ modulator 4, such that the optical E-field of the composite optical signal 8 appearing at the output of the MZ modulator 4 closely matches the target E-field modulation computed by the digital filter 36. Additionally, the compensation function c(t) can be selected to at least partially compensate impairments of an optical link 12 between the transmitter and the receiver 14, in which case the target E-field modulation represents a pre-distorted signal which will be transformed by the link impairments into a substantially undistorted optical signal at a receiver end 14 of the link 12.

As may be appreciated, the transmitter of FIG. 2A may be used to generate a linearly polarized optical channel signal 8, and can be adapted to generate a either a polarization multiplexed or a dual-polarization optical channel signal 8 by duplication of the complex driver circuit 34 filters 42 and amplifiers 44, ad use of a dual-polarization modulator 4.

Figure 2B:
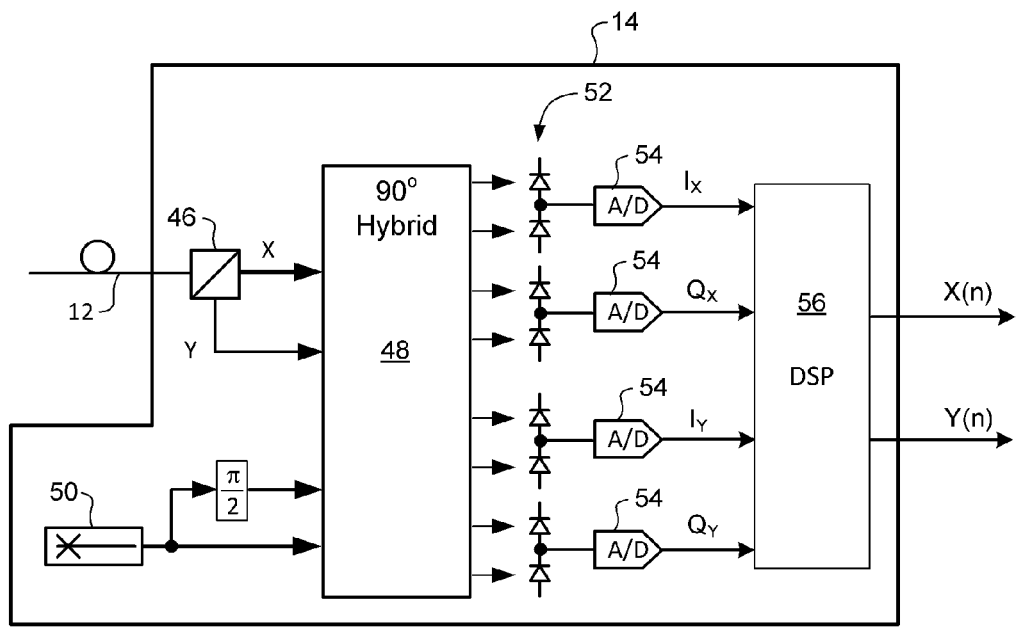

FIG. 2B schematically illustrates an a representative dual-polarization coherent optical receiver 14 known, for example, from U.S. Pat. No. 7,606,498.

In the coherent optical receiver 12 of FIG. 2B, the inbound optical channel signal 8 received through the optical link 12 is split into orthogonal received polarizations X, Y by a Polarization Beam Splitter 46. The received X and Y polarizations are then supplied to a conventional 90° optical hybrid 48, and mixed with Local Oscillator (LO) light having a frequency of ft generated by an receiver LO laser 50 and the composite lights emerging from the optical hybrid 48 supplied to a respective photodetector 52, which generates a corresponding analog detector signal. Typically, each photodetector 52 is provided as a balanced pair of P-Intrinsic-N (PIN) diodes, and the analog current of the corresponding detector signal is proportional to the optical power of the incident composite light. Each of the analog detector signals output by the photodetectors 52 is sampled by a respective Analog-to-Digital (A/D) converter 54, to yield multi-bit digital I and Q raw sample streams for each of the received X and Y polarizations. From the A/D converter 54 block, the I and Q raw sample streams of each received polarization are supplied to digital signal processor (DSP) 56 for carrier and data recovery using methods known in the art. The DSP 56 therefore generates a pair of recovered data streams X(n) and Y(n) corresponding to the data signals modulated onto each polarization at the transmitter.

The receiver arrangement of FIG. 2B is particularly advantageous in that the DSP 56 can compensate rapidly changing impairments such as polarization rotations and frequency jitter. Additionally, the DSP 56 can also implement a compensation function selected to at least partially compensate impairments of the optical fiber link 12 such as dispersion, and cross-talk. In some cases, it may be advantageous to configure the transmitter (FIG. 2A) and receiver (FIG. 2B) to implement complementary compensation functions, such that impairments of the optical fiber link 12 are partially pre-compensated in the transmitter, and partially post-compensated in the receiver.

In general, the present invention leverages the signal processing capabilities of DSP-based transmitters of the type described above to apply spectral shaping functions to the transmitted optical channel signal 8. In addition, the signal processing capabilities of DSP-based receivers of the type described are leveraged to remove at least some of the effects of these spectral shaping functions from the optical channel signal 8 received through the optical fiber link 12.

Based on the present description, it is expected that those of ordinary skill in the art will find multiple ways in which the present technique may be utilized. For the purposes of illustration, the present technique will be described with reference to two representative embodiments. The first embodiment uses the spectral shaping function to pre-emphasize selected spectral components of the baseband signal 24 so as to mitigate the effects of finite roll-off of downstream analog filter elements. In the second embodiment, the spectral shaping function is used to ensure that the transmitted optical channel signal 8 has a defined peak that is detectable by legacy line equipment.

Figure 3A:
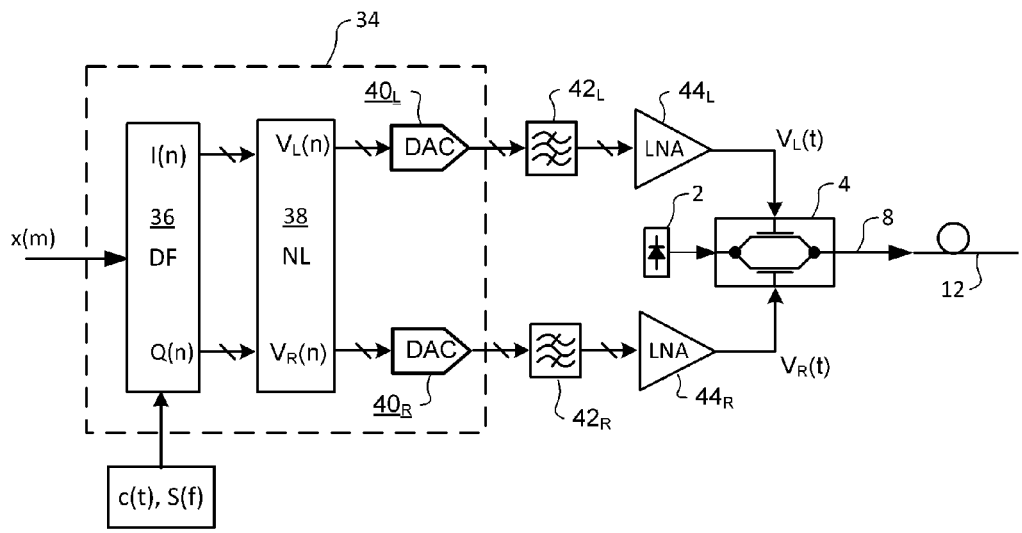
FIGS. 3A-3B schematically illustrate principal components and operation of a transmitter in accordance with a representative embodiment of the present invention.
Figure 3B:
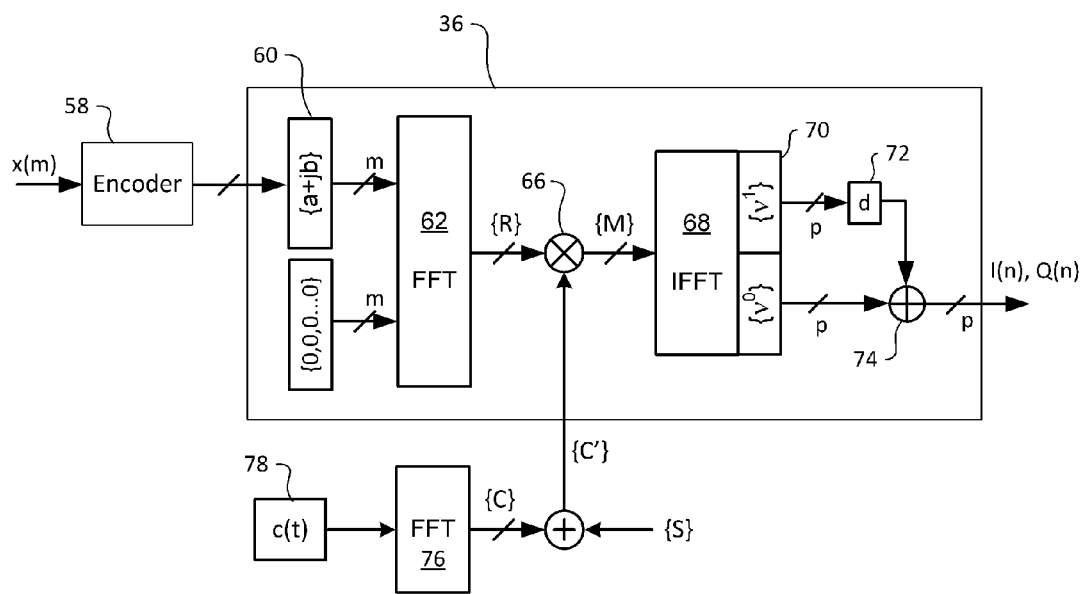

FIGS. 3A-B schematically illustrate a representative embodiment of a system implementing the present technique, in which a spectral shaping function S(t) is applied the target optical E-field to pre-emphasize selected spectral components so as to mitigate the effects of finite roll-off of downstream analog filter elements.

In the embodiment of FIG. 3A, the spectral shaping function S(f) is applied directly to the compensation function c(t) used to precompensate impairments of the optical fiber link 12. In this case, the spectral shaping function S(f) can be considered as a modifier of the compensation function c(t). Since the spectral shaping function S(f) is fully characterised as a function of frequency, it can be removed from a received channel signal 8 via appropriate digital signal processing in the receiver 14. By this means, performance degradations due to the spectral shaping function S(f) can be minimized.

FIG. 3B is a block diagram illustrating operation of a representative Frequency Domain digital filter 36 usable in the transmitter of FIG. 3A to provide frequency-domain impairment compensation and spectral shaping.

In the embodiment of FIG. 3B, the input data signal x(m) is supplied to an encoder 58, which outputs a corresponding multi-bit complex valued symbol stream. For example the input data signal x(m) may take the form of one or more serial bit-streams, and the multi-bit complex valued symbol stream output from the encoder 58 may take the form of PSK or QPSK symbols. Other encoding techniques may be used as desired, for example Optical Orthogonal Frequency Division Multiplexing (O-OFDM). In any case, the multi-bit symbols output from the encoder 58 are deserialized (at 60) and the resulting m-word input vector {a+jb} latched into a Fast Fourier Transform (FFT) block 62. The FFT block 62 is a conventional complex FFT block having a width selected to enable compensation of the maximum anticipated chromatic dispersion of the optical link. In some embodiments, the FFT block 62 may have a width of 896 taps, in which case m=448, but this is not essential.

The array {R} output by the FFT block 62 is supplied to a Frequency Domain multiplier 66, which applies a compensation vector {C} to the array {R} to yield a modified array {M}.

The modified array {M} output from the Frequency Domain multiplier 66 is then supplied to an Inverse Fast Fourier Transform (IFFT) block 68, which operates to generate time domain data 70, in the form of a complex valued vector having a width equal to the IFFT 68. The IFFT output data 70 is divided into two blocks {v⁰}, and {v¹}, of which {v¹} is delayed by one clock cycle (at 72) and added to {v⁰} (at 74) to yield the digital filter output in the form of a complex valued vector {I(n)+jQ(n)} representing I(n) and Q(n) values of the target optical E-field envelope.

In order to at least partially compensate chromatic dispersion of the optical fiber link 12, the compensation vector {C} can be computed using a complex FFT 76 of a $1^{st}$ order dispersive function 78. In this case, the complex FFT 76 preferably has the same width as the FFT block 62, so that the compensation vector {C} comprises a respective weighting factor for each output tap of the FFT block 62. With this arrangement, the Frequency Domain multiplier 66 may be provided as a respective multi-bit digital multiplier block (not shown) coupled to each output tap of the FFT block 62.

If desired, the phase distortions introduced by the analog filters 42 can be characterised as a function of frequency, using well known techniques, and this information used to modify the compensation vector {C} so as to compensate phase distortions introduced by the analog filters 42.

The spectral shaping function S(f) can similarly be computed as a vector {S} of weighting factors that can be used to modify the compensation vector {C}. With this arrangement, the modified compensation vector {C} can be used to apply any desired combination of chromatic dispersion compensation, phase distortion compensation, and spectral shaping to the target optical E-Field envelope of the channel signal 8.

FIGS. 4A-D illustrate an example embodiment, in which the spectral shaping function is used to pre-emphasize a portion of the baseband spectrum to compensate finite roll-off of the analog filters 42. In the illustrated embodiment, the desired baseband signal spectrum is approximately Gaussian (or a Raised Cosine function with a relatively high alpha (a)) and having a bandwidth of ±Fs/2. As may be seen in FIG. 4A, the analog filters are designed with a Low-Pass filter characteristic having a 3 dB cut-off at less than Fs/2 and a finite roll-off of, for example) 10-20 dB per decade. As may be seen in FIG. 4B, this arrangement will strongly suppress the harmonic bands, and so minimize out-of band noise. However, it will also suppress frequency components of the baseband signal 24 lying near to Fs/2. This may cause degradation of data transmission performance including possible problems with clock and carrier recovery in the receiver 14.

Figure 4A:
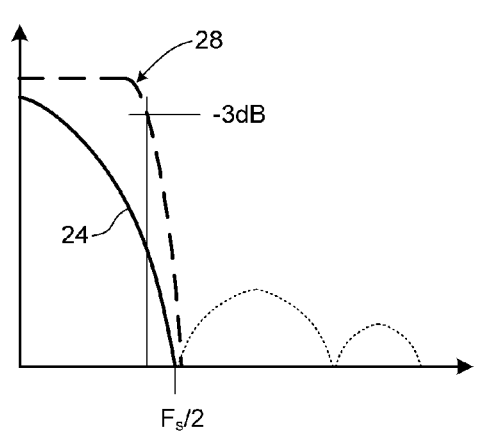
FIGS. 4A-4D are charts illustrating operation of the transmitter of FIGS. 3A-3B.
Figure 4B:
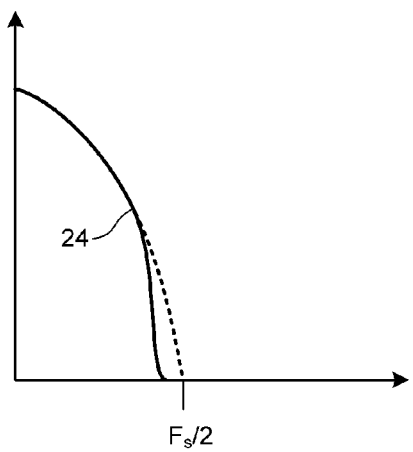
Figure 4C:
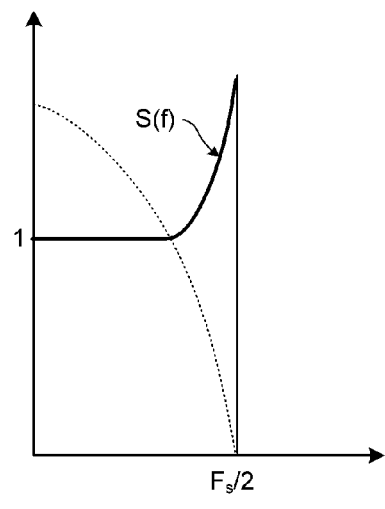
Figure 4D:
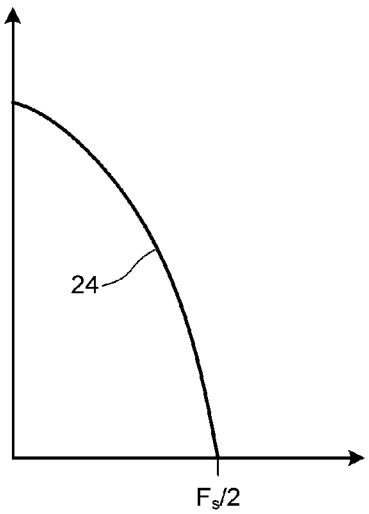

This problem may be mitigated by using a spectral shaping function S(f) of the form shown in FIG. 4C. As may be seen in the figure, the illustrated spectral shaping function S(f) has a value of 1 at the lower frequencies (and so imposes no change on those frequency components of the baseband spectrum) and then increases in value for frequency components lying near Fs/2. This has the effect of pre-emphasizing those frequency components. Subsequent attenuation of these pre-emphasized frequency components by the analog filters 42 produces a filtered baseband spectrum that more closely matches the desired Gaussian shape.

Because the spectral shaping function S(f) is digitally applied, the amount of pre-emphasis applied to each frequency component is limited primarily by the dynamic range of the DACs 40. In systems having sufficient dynamic range, it may be possible to fully compensate the finite roll-off of the analog filters 42 so that the filtered baseband signal 24 perfectly matches the desired spectrum of the target E-Field envelope.

In some embodiments, it may be desirable to apply different spectral shaping profiles to respective different portion of the baseband spectrum.

Figure 5A:
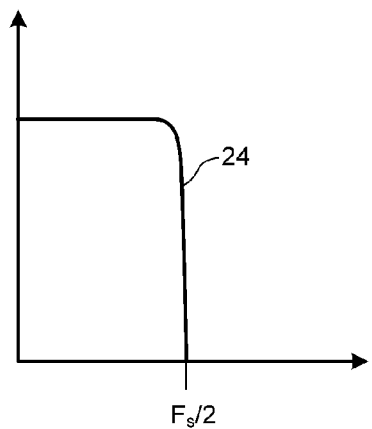
FIGS. 5A-5E are charts illustrating operation of the transmitter of FIGS. 3A-3B.

FIG. 5A illustrates a baseband signal spectrum is in the form of Raised Cosine function with a relatively low alpha (for example α=0.14) and having a bandwidth of ±Fs/2. Transmitters of the type described above with reference to FIGS. 2A and 3A are readily capable of generating an optical wavelength channel signal 8 having such a spectrum. A problem in this case is that some legacy line equipment may not properly distinguish between such a channel spectrum and Amplified Spontaneous Emission (ASE) noise, which may lead to undesirable operation of the line equipment. It has been found that this problem can be overcome by applying a shaping function S(f) which forms a detectable peak in the spectrum. However, it is also desired to ensure that the frequency components near Fs/2 are not excessively attenuated, for the reasons discussed above.

Figure 5B:
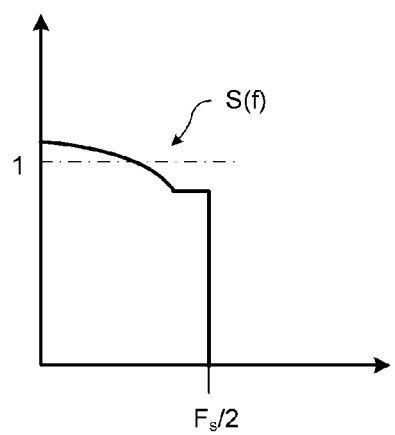
Figure 5C:
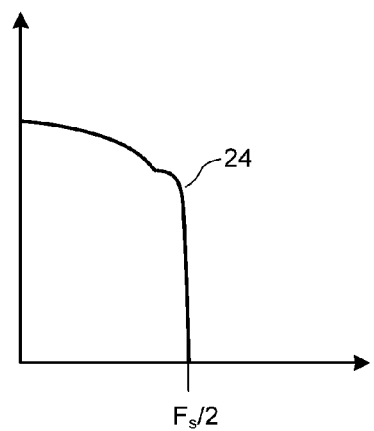

FIGS. 5B and 5C illustrate one possible solution to this problem. In FIG. 5B, the shaping function S(f) comprises curved portion for shaping lower frequency components of the baseband spectrum, and a "shoulder" of constant value at the higher frequencies near Fs/2. In some embodiments, the curvature of the lower-frequency portion may be Gaussian, or approximately Gaussian, but this is not essential. Similarly, the transition point between the curved portion and the shoulder portion may be selected based on any suitable criteria. If desired, the magnitude of the shaping function S(f) may be selected so that the total amount of energy within the baseband spectrum is unchanged, but this is not essential.

Applying the shaping function S(f) of FIG. 5B results in a baseband spectrum having the form illustrated in FIG. 5C. In this example, the baseband spectrum has been given a defined peak, and so can be properly detected by legacy line equipment, but the shoulder portion of the shaping functions preserves the high-frequency components lying near Fs/2 to help ensure proper operation of clock and carrier recovery functions at the receiver 14.

Figure 5D:
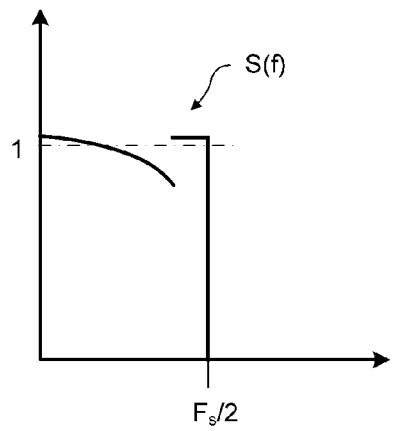
Figure 5E:
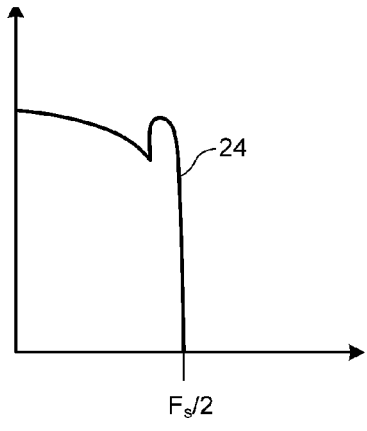

FIGS. 5D-E illustrate another possible solution to the above problem. In FIG. 5D, the shaping function S(f) comprises curved portion for shaping lower frequency components of the baseband spectrum, and a "shoulder" of constant value at the higher frequencies near Fs/2, similar to that of FIG. 5B. However, unlike the embodiment of FIG. 5B, the curved and shoulder portions of the shaping function S(f) are discontinuous with each other. Applying the shaping function S(f) of FIG. 5D results in a baseband spectrum having the form illustrated in FIG. 5E. In this example, the baseband spectrum has been given a defined peak, and so can be properly detected by legacy line equipment, but the high-frequency components lying near Fs/2 have also been pre-emphasized.

Figure 6:
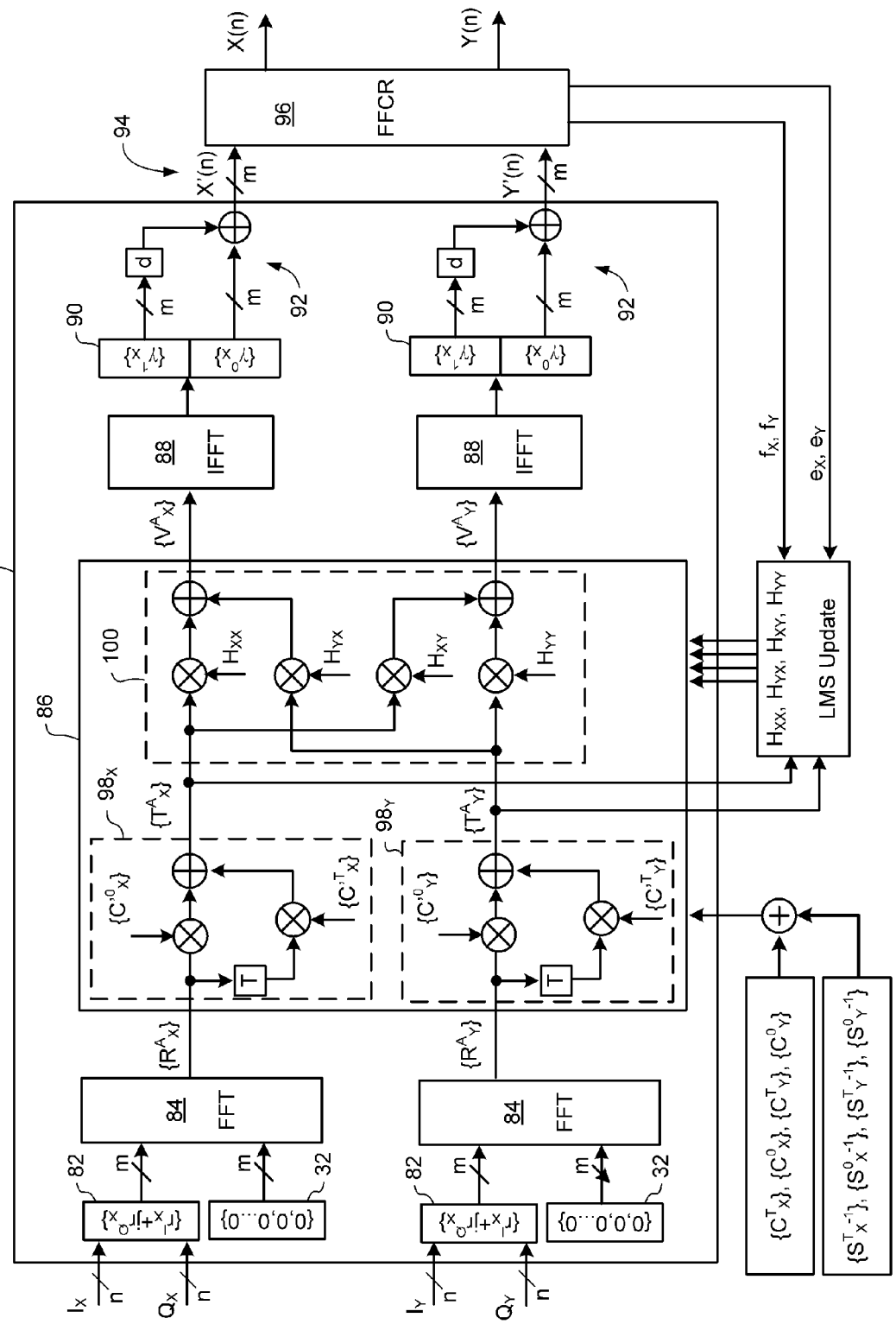
FIG. 6 schematically illustrates principal components and operation of a receiver in accordance with a representative embodiment of the present invention.

As noted above, because the shaping function S(f) is fully characterised, the DSP 56 of the receiver 14 can remove shaping function from the received signal. FIG. 6 schematically illustrates a representative DSP known, for example, from co-assigned U.S. Pat. No. 8,385,747 (the entire content of which is hereby incorporated herein by reference), which is capable of implementing this operation. In the DSP of FIG. 6, the raw digital sample streams $I_X$, $Q_X$, and $I_Y$, $Q_Y$ generated by the A/D converters 54 are deserialized (at 82) and the resulting m-word input vectors $\{r^I_X + jr^Q_X\}$ and $\{r^I_Y + jr^Q_Y\}$ latched into respective X- and Y-polarization FFT blocks 84. The arrays $\{R^A_X\}$ and $\{R^A_Y\}$ output by the FFT blocks 84 are then supplied to a Frequency Domain Processor (FDP) 86, as will be described below.

In the embodiment of FIG. 6, the FDP 86 comprises a respective transpose-and-add functional block 98 for each polarization, and a cross-compensation block 100. The transpose-and-add block 98 applies a compensation function C[ ] to the received signal. Thus, the X-polarization transpose-and-add block 98x operates to multiply the FFT output array $\{R^A_X\}$ and a transposed version of itself, $\{\overline{R}_X^A\}$, with respective different vectors $\{C^{t0}_X\}$ and $\{C^{tT}_X\}$, and add the two products together to yield intermediate array $\{T^A_X\}$. As may be seen in FIG. 6, the vectors $\{C^{t0}_X\}$ and $\{C^{tT}_X\}$ may be computed by adding inverse shaping function vectors $\{S^{0^{-1}}_X\}$ and $\{S^{T^{-1}}_X\}$ to corresponding compensation vectors $\{C^0_X\}$ and $\{C^T_X\}$. The inverse shaping function vectors $\{S^{0^{-1}}_X\}$ and $\{S^{T^{-1}}_X\}$ are preferably selected to remove the effects of the shaping function S(f) applied by the transmitter. The compensation vectors $\{C^0_X\}$ and $\{C^T_X\}$ may be computed to at least partially compensate chromatic dispersion of the optical link 12. Of course, the Y-polarization transpose-and-add block 98$_Y$ will operate in an exactly analogous manner.

The cross-compensation block 100 applies X-polarization vectors $H_{XX}$, $H_{YX}$ to the X-polarization intermediate array $\{T^A_X\}$, and Y-polarization vectors $H_{YY}$, $H_{XY}$ to the Y-polarization intermediate array $\{T^A_Y\}$. The multiplication results are then added together to generate modified vectors $\{V^A_X\}$ and $\{V^A_Y\}$, as may be seen in FIG. 6. The X- and Y-polarization vectors $H_{XX}$, $H_{XY}$, $H_{YY}$ and $H_{YX}$ are preferably computed using a transform of the total distortion at the output of the equalizer 56, in a manner known from co-assigned U.S. Pat. No. 8,385,747. At a minimum, the X- and Y-polarization vectors $H_{XX}$, $H_{XY}$, $H_{YY}$ and $H_{YX}$ impose a phase rotation which compensates polarization impairments of the optical signal, and so de-convolve the transmitted symbols from the raw digital sample streams $I_X$, $Q_X$, and $I_Y$, $Q_Y$ generated by the A/D converters 54. Those of ordinary skill in the art will recognise that the illustrated cross-compensation block 100 implements an inverse-Jones matrix transfer function, which compensates the polarization effects. In this formulation, the vectors $H_{XX}$, $H_{XY}$, $H_{YY}$ and $H_{YX}$ are provided as the coefficients of the inverse-Jones matrix. The width of the inverse-Jones matrix is equal to that of the intermediate arrays $\{T^A_X\}$ and $\{T^A_Y\}$, and so is based on the expected maximum dispersion of the received optical signal to be compensated by the equalizer 56.

The modified arrays $\{V^A_X\}$ and $\{V^A_Y\}$ output by the FDP 86 are supplied to respective IFFT blocks 88, and the resulting time domain data 90 processed using respective overlap-and-add blocks, to yield an equalizer output 94 in the form of complex valued vectors $\{v^I_X + jv^Q_X\}$ and $\{v^I_Y + jv^Q_Y\}$, each of which encompasses m complex valued estimates X'(n) and Y'(n) of the transmitted symbols. These complex valued estimates X'(n) and Y'(n) of the transmitted symbols are then processed by a carrier recovery block 96 to yield decision values of the recovered data streams X(n) and Y(n).

It will be appreciated that the presently described technique may be implemented in many ways, without departing from the intended scope of the present invention.

The embodiment(s) of the invention described above is(are) intended to be representative only. The scope of the invention is therefore intended to be limited solely by the scope of the appended claims.

We claim:

1. A method of generating an optical channel signal for transmission through an optical fiber link of an optical communications system, the method comprising steps of:
   a digital filter processing an input data signal using a compensation function and a spectral shaping function to generate a pair of multi-bit sample streams representing a target optical E-field envelope of the optical channel signal; and
   a modulator modulating an optical carrier light using the pair of multi-bit sample streams to generate the optical channel signal;
   the compensation function at least partially compensating impairments of the optical fiber link; and
   the predetermined spectral shaping function being designed to pre-emphasize predetermined frequency components of a baseband spectrum of the target optical E-field envelope.

2. The method of claim 1, wherein the pre-emphasized frequency components are selected to at least partially compensate finite roll-off of an analog filter between the digital filter and the modulator.

3. The method of claim 1, wherein the spectral shaping function is designed to impose a predetermined shape to a predetermined portion of the baseband spectrum.

4. The method of claim 3, wherein the predetermined shape comprises a detectable peak.

5. The method of claim 4, wherein the predetermined shape comprises a shoulder at higher frequency components of the baseband spectrum.

6. The method of claim 5 wherein the shoulder of the spectral shaping function is designed to pre-emphasize frequency components used for at least clock recovery in a receiver.

7. The method of claim 5, wherein the shoulder portion of the spectral shaping function is designed to preserve frequency components used for at least clock recovery in a receiver.

8. The method of claim 1, wherein spectral the shaping function has different profiles in respective different portions of the baseband spectrum.

9. The method of claim 8, wherein the spectral shaping function is discontinuous.

10. The method of claim 1, wherein a magnitude of the spectral shaping function is selected such that imposing the spectral shaping function does not change a total energy of the optical channel signal.

11. The method of claim 1, wherein the spectral shaping function is designed to optimise a performance of the optical fiber link.

12. A transmitter for generating an optical channel signal for transmission through an optical fiber link of an optical communications system, the transmitter comprising:
   a digital filter configured to process an input data signal using a compensation function and a spectral shaping function to generate a pair of multi-bit sample streams representing a target optical E-field envelope of the optical channel signal; and a modulator configured to modulate an optical carrier light using the pair of multi-bit sample streams to generate the optical channel signal;

wherein the compensation function at least partially compensating impairments of the optical fiber link; and wherein the predetermined spectral shaping function being designed to pre-emphasize predetermined frequency components of a baseband spectrum of the target optical E-field envelope.

13. The transmitter of claim 12, wherein the pre-emphasized frequency components are selected to at least partially compensate finite roll-off of an analog filter between the digital filter and the modulator.

14. The transmitter of claim 12, wherein the spectral shaping function is designed to impose a predetermined shape to a predetermined portion of the baseband spectrum.

15. The transmitter of claim 14, wherein the predetermined shape comprises a detectable peak.

16. The transmitter of claim 15, wherein the predetermined shape comprises a shoulder at higher frequency components of the baseband spectrum.

17. The transmitter of claim 16, wherein the shoulder of the spectral shaping function is designed to per-emphasize frequency components used for at least clock recovery in a receiver.

18. The transmitter of claim 12, wherein the spectral shaping function has different profiles in respective different portions of the baseband spectrum.

19. The transmitter of claim 18, wherein the spectral shaping function is discontinuous.

20. A receiver for receiving an optical channel signal through an optical fiber link from a transmitter of an optical communications system, the receiver comprising:

a digital signal processor configured to process sample streams of the optical channel signal using a compensation function and an inverse spectral shaping function to generate a recovered data signal;

the compensation function at least partially compensating chromatic dispersion of the optical fiber link; and the predetermined inverse spectral shaping function reversing effects of a predetermined shaping function applied to the optical channel signal by the transmitter, the predetermined shaping function being designed to pre-emphasize predetermined frequency components of a baseband spectrum of the optical channel signal transmitted by the transmitter.

* * * * *